April 6, 1965   M. A. BROWN   3,176,379
MOTOR END BELL AND CASE ASSEMBLY
Filed Sept. 20, 1960

INVENTOR
Marvin A. Brown
BY
McCanna, Morsbach & Pillote
ATTORNEYS

United States Patent Office 3,176,379
Patented Apr. 6, 1965

3,176,379
MOTOR END BELL AND CASE ASSEMBLY
Marvin A. Brown, Davenport, Iowa, assignor to Red Jacket Manufacturing Co., Davenport, Iowa, a corporation of Iowa
Filed Sept. 20, 1960, Ser. No. 57,335
8 Claims. (Cl. 29—155.5)

This invention relates to improvements in electrical motor constructions and particularly to an improved motor end bell and shell construction and method for assembling the same.

It is the common practice in assembling motor end bells to the stator shells to employ axially extending fasteners for drawing the end bells toward each other and against the end of the shell. In some constructions, the fasteners extend between the end bells either through the stator laminations or alongside the outer periphery of the stator. Such constructions are not entirely suitable for some applications, such as submersible motors for use in wells and the like, wherein it is necessary to minimize the overall dimensions of the motor and to seal the motor enclosure. In other constructions, the axially extending fasteners are mounted on the end bells and engage lugs which extend outwardly into engagement with the stators shell to draw the end bells axially against the stator shell. In general, the latter arrangements are relatively expensive to manufacture and assemble.

An important object of this invention is to provide a simple and economical method and apparatus for securing the motor end bells on the stator shell and for aligning the end bell bearings with the shaft and the stator.

A more particular object of this invention is to provide and improved method and apparatus for securing the motor end bells to the stator shell which employs generally radially expansible fasteners for securing the end bell to the shell and in which the fasteners are arranged to accommondate relatively wide tolerance variations in the locations of the fastener openings in the shell and end bells.

Still another object of this invention is to provide a motor end bell and shell assembly in which the end bells have a locating flange adapted to abut the end of the shell and align the end bell bearings with the shell, and in which generally radially extending expansible fasteners are employed to secure the end bells to the shell and arranged so as to cam the end bells axially into engagement with the ends of the shell.

Yet another object of this invention is to provide an improved motor end bell and shell assembly in accordance with the foregoing objects in which the end bells are sealed to the shell to provide a sealed motor enclosure.

These, together with various ancillary objects and advantages of this invention will be more readily appreciated as the same becomes better understood by reference to the following detailed description when taken in connection with the accompanying drawings wherein.

Figure 1:
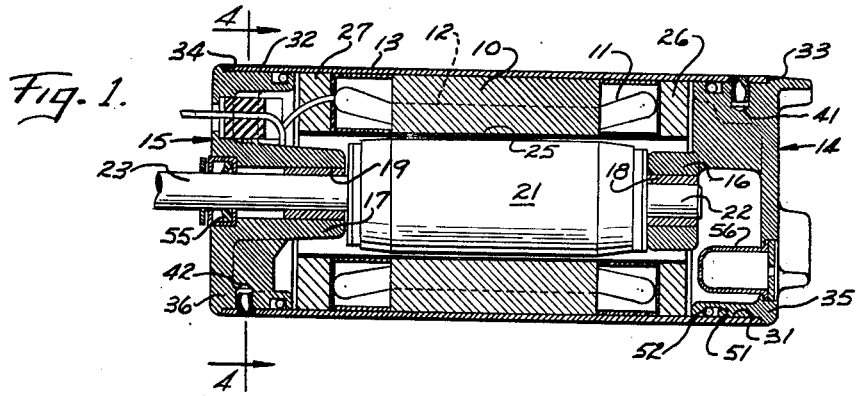
FIGURE 1 is a longitudianl, sectional view through a motor constructed in accordance with present invention.
Figure 2:
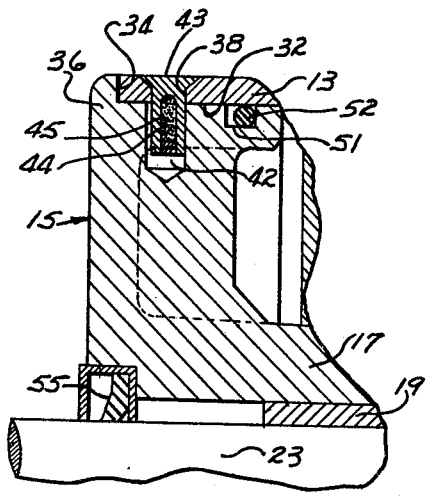
FIG. 2 is a fragmentary enlarged sectional view through one of the motor end bells and the shell, and illustrating the radial expansible fastener prior to expansion thereof.
Figure 3:
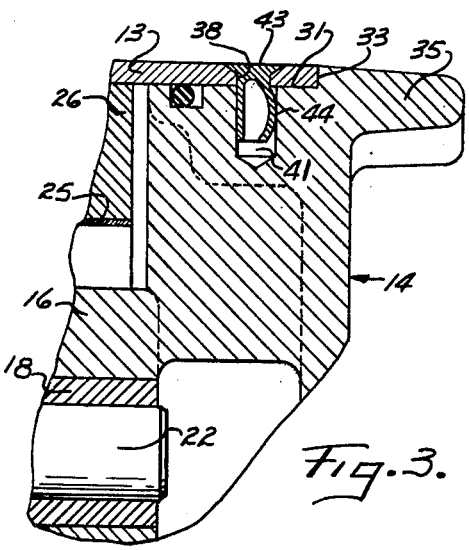
FIG. 3 is a fragmentary sectional view through the end bell and shell illustrating the fastener in an expanded condition.
Figure 4:
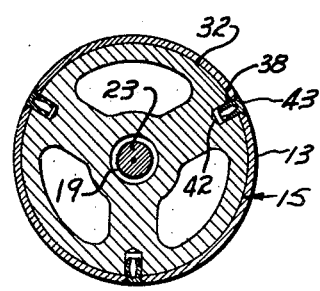
FIG. 4 is a transverse sectional view taken on the plane 4—4 of FIG. 1.

The method and apparatus for assembling the motor end bell and shell is generally adapted for use on electrical motors and is particularly adapted for use on submersible type electrical motors wherein it is necessary to minimize the overall dimensions of the motors for use in confined well casings and the like, and to also seal the motor enclosure. The motor includes the conventional stator 10, commonly formed of a multplicity of stack laminations, and having windings 11 disposed in slots 12 formed in the stator. A tubular shell 13 surrounds the stator and projects from opposite ends thereof, and end bells 14 and 15 are mounted at opposite ends of the shell. The end bells have bearing supports 16 and 17 respectively which carry bearings 18 and 19. A rotor 21 is disposed within the stator 10 and has oppositely extending shaft portions 22 and 23 which are rotatably supported in the bearings 18 and 19. In the embodiment illustrated, a tubular liner 25 is disposed within the stator and sealed at its ends to the outer shell 13 by ring members 26 and 27.

It is essential to proper operation of the motor that the bearings 18 and 19, when assembled on the shell, be aligned with the shaft portions 22 and 23 of the rotor to prevent binding, and that the rotor be disposed substantially concentric to the stator 10 so as to provide a substantially uniform air gap therearound. As shown, the end bells 14 and 15 are each formed with a peripheral wall designated 31 and 32 respectively which is substantially concentric with the respective bearings 18 and 19 and which is dimensioned to be snugly received in the outer sleeve 13 to support the end bells in the outer sleeve with the bearings disposed substantially concentric thereto. In production, it is a relatively simple matter to accurately maintain concentricity between the bearings and the outer peripheral walls on the end bells. In order to properly align the bearings with the rotor shaft portions 22 and 23, it is also necessary to mount the end bells in the shell in such a manner as to prevent tilting or cocking of the end bells relative to the shell and rotor. In the preferred form of the invention, this is achieved by forming the ends 33 and 34 of the shell 13 so that the ends lie perpendicular to the axis of the shell, and by forming outwardly extending flanges 35 and 36 on the end bells, which flanges are disposed normal to the respective bearings 18 and 19 so that the bearings will be substantially aligned when the end bell flanges abut the ends of the shell.

An improved arrangement employing radially extending fasteners is provided for securing the end bells to the shell. For this purpose, the shell 13 is formed with a set of circumferentially spaced openings 38 adjacent each end of the shell and the end bells 14 and 15 are formed with a corresponding set of openings designated 41 and 42 respectively in the peripheral walls thereof. Expansible type fasteners 43 are inserted through the openings 38 in the shell into openings 41 and 42 in the end bells, and the fasteners are then radially expanded in the openings in the end bells. The expansible fasteners 43 herein shown are of the explosive type which have a hollow core 44 and a small explosive charge 45 disposed in the core, and which charge explodes and expands the rivet upon application of heat thereto. It is to be understood, however, that other types of expansible fasteners could be used such as the "Pop" rivets manufactured by United Shoe Machinery Corporation, which rivets are mechanically expanded by means of a mandrel.

While proper concentricity can be maintained in production between the coaxial bearings and peripheral walls on the end bells, and while it is also a relatively easy matter to maintain the ends of the shell and the flanges on the end bells normal to the respective bodies, some difficulty is encountered in maintaining accurate spacing of the openings such as 38, 41 and 42 in the shell and end bells, particularly when it is desired to simultaneously drill or form all of the openings in each set at one time, as by multiple drills. Small variations in the spacings between the openings 38 and the adjacent end 33 or 34 of the shell, and small variations in the spacings between the openings in the end bells and the respective flanges, tend to occur in production. In addition, there are also some slight variations in the circumferential spacing of the holes in the shell and end bells. In order to accommodate the tolerance variations in the location of the openings in the shell and end bell, the openings 41 and 42 in the end bells are made slightly larger than the corresponding openings 38 in the shell. The shell openings are dimensioned to provide a relatively close fit with the shank of the rivets. When the rivets are inserted through the openings 38 in the shell into the openings 41 or 42 in the respective end bells and thereafter expanded, they substantially fill the openings in the end bells and expand in the direction of least resistance so as to accommodate any misalignment between the openings in the shell and end bells. In this manner, the end bells can be secured to the shell with the flanges thereon in abutting relation to the ends of the shell, notwithstanding variations in the alignment between the openings in the shell and end bells. In order to assure that the flanges are firmly pressed against the ends of the shell, the openings 41 and 42 in the end bells are advantageously positioned relatively closer to the respective flanges, than the spacing between the openings 38 in the shell and the adjacent end of the shell. With this arrangement, the expansion of the rivet will tend to cam the end bells axially inwardly of the shell to firmly press the flanges thereon against the ends of the shell. As will be noted, when the inner portion of the rivets expand into the openings in the end bells, they effectively lock the rivets against axial withdrawal. Removal of the rivets for repair of the motor can be effected by drilling the rivets out.

While it is the preferred form of the invention to employ the flanges 35 and 36 on the end bells for engaging the ends of the shell to align the end bells therewith, it has been found that the end bells can be assembled on the shell in proper alignment with the rotor axis when the flanges or the end of the shell is not exactly perpendicular to the respective body, and even when the flanges are omitted entirely. In this mode of assembly, the end bells are inserted into the shell so that the outer peripheral walls 31 and 32 of the end bells support the bearings substantially concentric with the shell. Instead of relying upon the flanges to prevent tilting or cocking of the end bells, both end bells are assembled onto the shaft portions 22 and 23 of the rotor so that the bearings on the end bells are substantially aligned by engagement with the rotor shaft. After both end bells are assembled into the shells and onto the rotor shaft, the expansible rivets 43 are inserted into the openings in the shell into the openings in the end bell and thereafter radially expanded. The end bell bearings prevent substantial tilting or cocking of the end bells and the expansible rivets expand in the openings in the end bells in the direction of least resistance so that they secure the end bells to the shell in the position that the end bells are maintained by the shaft. In order that the shaft properly functions to align the end bells, it is necessary to use "long" bearings, that is bearings having a length substantially greater than the diameter so as to preclude significant tilting between the bearings and the respective shaft portions.

As previously noted, the motor construction herein illustrated is of the submersible type and provision is made for sealing the end bells to the shell. Since the radial fasteners do not extend axially through the end bells into the motor, sealing is markedly facilitated. As shown, the end bells are each provided with a peripheral groove 51 and an O-ring 52 is disposed in the groove to engage the outer shell and seal the the interface therebetween. The O-rings and grooves are located axially inwardly of the radial fasteners so that any leakage past the fasteners will not enter the motor chamber. The motor chamber is sealed around the shaft portion 23 by a conventional shaft seal 55 and an expansion chamber 56 is provided in one of the end bells 14 to accommodate expansion and contraction of the liquid in the motor, with changes in temperature.

From the foregoing it is thought that the construction and mode of practicing the present invention will be readily understood. In general, the openings in the shell and end bells are formed prior to assembly of the shell on the end bells, and conveniently by a multiple type drill which forms all of the openings in one set at a time to eliminate the necessity of indexing the shell and end bells to drill the several holes in each set. The expansible fasteners are inserted through the openings in the shell into the openings in the end bell, after assembly of each end bell on the shell. In the preferred form of the invention, the flanges on the end bells are utilized to properly align the end bell bearings, and the expansible fasteners are thereafter radially expanded to secure the end bells to the shell in the position determined by engagement of the flanges with the shell. In this mode of assembly, one end bell is first assembled onto the shell, the rotor thereafter inserted into the shell and into the bearing on that end bell, and the other end bell subsequently assembled onto the shell and roto. In the alternative method of assembly, both end bells are assembled onto the shell and onto the rotor shaft so that the rotor shaft aligns the end bell bearings. With this latter mode of assembly, the end bell bearings will be properly aligned even if one of the flanges or one of the shell are not exactly perpendicular to their respective axis, or if the flange is omitted entirely.

I claim:

1. The method of assemblying a stator shell, a rotor, and an end bell having bearings for rotatably supporting the rotor on the shell comprising, forming a plurality of circumferentially spaced openings in the periphery of the end bell and a plurality of openings in the end of the shell having a circumferential spacing approximately equal to the spacing between the openings in the end bell prior to assembly of the end bell on the shell, inserting the end bell into the end of the shell, inserting expansible fasteners through the openings in the shell into the openings in the end bell, locating the end bell in a preselected position on the shell by engaging the end bell with at least one of the items comprising the shell and rotor to align the axis of the bearing in the end bell with the rotor axis, the openings in the end bell having a cross-section sufficiently larger than the cross-section of the unexpanded fastener to receive the same and accommodate tolerance variations in the relative axial and circumferential positions of the openings in the shell and end bell when the end bell is in said preselected position, and radially expanding the fasteners in the openings in the end bell while the end bell is located in said preselected position to lock the end bell in said preselected position and accommodate any misalignment between the openings in the shell and end bell.

2. The method of assembling a stator shell, a rotor, and an end bell having bearings for rotatably supporting the rotor on the shell comprising, forming a first set of circumferentially spaced openings in one end of the shell, forming a second set of openings in the periphery of the end bell prior to assembly on the shell having a diameter larger than the openings in the shell and a circumferential spacing approximately equal to the spacing of the openings in the shell, inserting the periphery of the end bell into the end of the shell, inserting expansible fasteners through the openings in the shell into the openings in the end bell, locating the end bell in a preselected position on the shell by engaging the end bell with at least one of the items comprising the shell and rotor to align the axis of the bearing in the end bell with the rotor axis, the openings in the end bell having a cros-section sufficiently larger than the cross-section of the unexpanded fastener to receive the same and accommodate tolerance variations in the relative axial and circumferential positions of the openings in the shell and end bell when the end bell is in said preselected position, and radially expanding the fasteners in the openings in the end bell while the end bell is located in said preselected position to lock the end bell in said preselected position and accommodate any misalignment between the openings in the end bell and shell.

3. The method of assembling a stator shell, a rotor, and an end bell having bearings for rotatably supporting the rotor on the shell comprising, forming a first set of circumferentially spaced openings in one end of the shell, forming a second set of circumferentially spaced sockets in the periphery of the end bell prior to assembly on the shell having a diameter larger than the openings in the shell and approximately the same circumferential spacing, inserting the periphery of the end bell into the shell and aligning the axis of the end bell bearing with the shell, inserting expansible fasteners through the openings in the shell into the sockets in the end bell, locating the end bell in a preselected position on the shell by engaging the end bell with at least one of the items comprising the shell and rotor to align the axis of the bearing in the end bell with the rotor axis, the sockets in the end bell having a cross-section sufficiently larger than the cross-section of the unexpanded fasteners to receive the same and accommodate tolerance variations in the relative axial and circumferential positions of the openings in the shell and the sockets in the end bell when the end bell is in said preselected position, said sockets having a depth greater than the length of the fasteners, and radially expanding the fasteners in the openings in the end bell while the end bell is located in said preselected position to lock the end bell in said preselected position and accommodate axial and circumferential misalignment between the sockets in the end bell and the openings in the shell.

4. The method of assembling a stator shell, a rotor having a drive shaft, and an end bell having bearings for rotatably supporting the drive shaft comprising, forming the end bell with a peripheral wall concentric with the bearing and dimensioned to be snugly received in the end of the shell, forming a locating flange on the periphery of the end bell disposed in a plane perpendicular to the bearing axis, forming a first set of openings in the end of the shell, forming a second set of circumferentially spaced openings in said peripheral wall of the end bell prior to assembly of the end bell on the shell having a diameter larger than the openings in the shell and approximately the same circumferential spacing, inserting the end bell into the end of the shell with the flange abutting the end of the shell to align the end bell bearing with the shell, inserting expansible fasteners through the openings in the shell into the openings in the end bell, the openings in the end bell having a cross-section sufficiently larger than the cross-section of the unexpanded fastener to receive the same and accommodate tolerance variations in the relative axial and circumeferential positions of the openings of the shell and end bell when the bearing in the end bell is aligned with the shell, and radially expanding the fasteners in the openings in the shell while the bearing in the end bell is aligned with said shell to lock the end bell in an aligned position and accommodate any misalignment between the openings in the end bell and shell.

5. The method of assembling a stator shell, a rotor having a drive shaft, and an end bell having bearings for rotatably supporting the drive shaft comprising, forming the end bell with a peripheral wall concentric with the bearing and dimensioned to be snugly received in the end of the shell, forming a locating flange on the periphery of the end bell disposed in a plane perpendicular to the bearing axis, forming a first set of circumeferentially spaced openings in the shell spaced from one end thereof, forming a second set of openings in the peripheral wall of the shell having a diameter larger than the openings in the shell and spaced from the flange a distance slightly less than the spacing between the first set of openings and the end of the shell, inserting the peripheral wall of the end bell into the shell with the flange abutting the end of the shell to align the end bell bearing with the shell, inserting expansible fasteners through the openings in the shell into the openings in the end bell, the openings in the end bell having a cross-section sufficiently larger than the cross-section of the unexpanded fastener to receive the same and accommodate tolerance variations in the relative axial and circumferential positions of the openings in the shell and end bell when the bearing in the end bell is aligned with the shell, and radially expanding the fasteners in the openings in the end bell to cam the end bell axially inwardly of the shell and press the flange thereon firmly against the end of the shell.

6. The method of assembling a stator having an outer shell, a rotor having oppositely extending shaft portions, and end bells having bearings for rotatably supporting the rotor shaft portions comprising, forming a plurality of circumeferentially spaced openings in the periphery of the end bells and a plurality of openings in the shell having a spacing substantially equal to the spacing between the openings in the end bells prior to assembly of the end bells on the shell, inserting the end bells into the ends of the shell and aligning the axes of the end bells, inserting expansible fasteners through the openings in the shell and end bells, the openings in the end bells having a cross-section sufficiently larger than the cross-section of the unexpanded fasteners to receive the same and accommodate tolerance variations in the relative axial and circumferential positions of the openings in the shell and end bells when the axes of said end bells are aligned, and radially expanding the fasteners in the openings in the end bells while the end bell axes are aligned to lock the end bell in aligned condition to the shell and accommodate misalignment between the openings in the shell and end bells.

7. The method of assembling a stator having an outer shell, a rotor having oppositely extending shaft portions, and end bells having bearings for rotatably supporting the shaft portions on the shell comprising forming a plurality of circumferentially spaced openings in the periphery of the end bells and a corresponding plurality of openings in the end of the shell prior to assembly of the end bell on the shell, assembling the end bells on the shaft portions of the rotor and inserting the end bells into opposite ends of the shell to align the end bell bearings with the shaft portions, inserting expansible fasteners through the openings in the shell into the openings in the end bells, the openings in the end bells having a cross-section sufficiently larger than the cross-section of the unexpanded fasteners to receive the same and accommodate tolerance variations in the relative axial and circumferential positions of the openings in the shell and end bells when the axes of said end bells are aligned, and radially expanding the fasteners in the openings in the end bells while the end bell axes are aligned to secure the end bells to the shell with the bearings aligned with the rotor shaft portions.

8. The method of assembling a stator having an outer shell, a rotor having oppositely extending shaft portions, and a pair of end bells having bearings for rotatably supporting the shaft portions comprising, forming a set of circumferentially spaced openings adjacent each end of the shell, forming a corresponding set of circumferentially spaced openings in the periphery of each end bell, assemblying the end bells on the shaft portions and inserting the end bells into the shell to align the end bell bearings with the shaft portions, inserting expansible fasteners through the openings in the openings in the shell into the openings in the end bells, the openings in the end bells having a cross-section sufficiently larger than the cross-section of the unexpanded fasteners to receive the same and accommodate tolerance variations in the relative axial and circumferential positions of the openings in the shell and end bells when the axes of said end bells are aligned, and radially expanding the fasteners in the openings in the end bells after both end bells have been assembled on the shaft to secure the end bells to the shell with the bearings aligned with the shaft portions.

References Cited by the Examiner

UNITED STATES PATENTS

| | | | |
|---|---|---|---|
| 1,858,666 | 5/32 | Gilmer | 310—67 |
| 2,064,090 | 12/36 | Sullivan | 310—259 |
| 2,169,617 | 8/39 | Schmidt | 310—259 |
| 2,354,551 | 7/44 | Sawyer | 29—155.5 |
| 2,357,111 | 9/44 | Vinson | 85—63 |
| 2,556,465 | 6/51 | Burrows et al. | 85—40 |
| 2,579,487 | 12/51 | Frankwich | 29—155.5 |
| 2,593,857 | 4/52 | De Windt et al. | 29—155.5 |
| 2,650,992 | 9/53 | Forss et al. | 310—42 |
| 2,817,026 | 12/57 | Robinson et al. | 310—90 X |

WHITMORE A. WILTZ, *Primary Examiner.*

ORIS L. RADER, MILTON O. HIRSHFIELD, JOHN F. CAMPBELL, *Examiners.*